(12) United States Patent
Broers et al.

(10) Patent No.: US 12,200,843 B2
(45) Date of Patent: Jan. 14, 2025

(54) SENSOR DEVICE FOR CONTROLLING AN ELECTRICAL DEVICE

(71) Applicant: SIGNIFY HOLDING B.V., Eindhoven (NL)

(72) Inventors: Harry Broers, 'S-Hertogenbosch (NL); Jan Ekkel, Oss (NL); Maurice Herman Johan Draaijer, Ittervoort (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 115 days.

(21) Appl. No.: 17/790,558

(22) PCT Filed: Dec. 21, 2020

(86) PCT No.: PCT/EP2020/087429
§ 371 (c)(1),
(2) Date: Jul. 1, 2022

(87) PCT Pub. No.: WO2021/136707
PCT Pub. Date: Jul. 8, 2021

(65) Prior Publication Data
US 2023/0031037 A1    Feb. 2, 2023

(30) Foreign Application Priority Data

Jan. 2, 2020    (EP) .................................... 20150071
Jan. 9, 2020    (EP) .................................... 20151036

(51) Int. Cl.
*H05B 47/19*    (2020.01)
*G01S 17/10*    (2020.01)

(52) U.S. Cl.
CPC .............. *H05B 47/19* (2020.01); *G01S 17/10* (2013.01)

(58) Field of Classification Search
CPC ...... H05B 47/00; H05B 47/115; H05B 47/17; H05B 47/19; H05B 47/1975; F21V 23/00; F21V 23/0492; F21V 23/0471; G01S 17/10; G01J 5/07; G01J 5/0025; G01J 5/027; G01J 5/0275
See application file for complete search history.

(56) References Cited

U.S. PATENT DOCUMENTS

| | | | |
|---|---|---|---|
| 8,547,327 B2 | 10/2013 | Clarkson et al. | |
| 9,679,465 B2 | 6/2017 | Matsuoka et al. | |
| 10,107,480 B1 | 10/2018 | Ladewig et al. | |

(Continued)

FOREIGN PATENT DOCUMENTS

TW    201239565 A    10/2012

*Primary Examiner* — Thai Pham

(57) ABSTRACT

The invention provides a sensor device for controlling an electrical device, wherein the sensor device comprises a controller and a range sensor; wherein sensor device is configured to be mounted in an orientation relative to gravity; wherein the range sensor is configured to: obtain the orientation of the sensor device relative to gravity; operate in a first detection mode for detecting an object within a first predetermined distance range from the range sensor when the orientation is in a first predetermined orientation; wherein the controller is configured to output a control signal arranged for controlling the electrical device upon the range sensor detecting the object.

17 Claims, 5 Drawing Sheets

(56) References Cited

U.S. PATENT DOCUMENTS

| | | | |
|---|---|---|---|
| 2015/0145419 A1* | 5/2015 | Lashina | H05B 47/11 |
| | | | 315/153 |
| 2018/0031703 A1* | 2/2018 | Ngai | G01S 7/484 |
| 2018/0153023 A1* | 5/2018 | Meerbeek | H04R 1/028 |
| 2018/0181208 A1 | 6/2018 | Moscarillo | |
| 2020/0329546 A1* | 10/2020 | Krajnc | H05B 47/19 |
| 2021/0329765 A1 | 10/2021 | Van De Sluis et al. | |

\* cited by examiner

SENSOR DEVICE FOR CONTROLLING AN ELECTRICAL DEVICE

CROSS-REFERENCE TO PRIOR APPLICATIONS

This application is the U.S. National Phase application under 35 U.S.C. § 371 of International Application No. PCT/EP2020/087429, filed on Dec. 21, 2020, which claims the benefit of European Patent Application No. 20150071.7, filed on Jan. 2, 2020 and European Patent Application No. 20151036.9, filed on Jan. 9, 2020. These applications are hereby incorporated by reference herein.

FIELD OF THE INVENTION

The invention relates to a sensor device for controlling an electrical device, wherein the sensor device comprises a controller, optionally a pivotable head and a range sensor. The range sensor is preferably a Time-of-Flight sensor. The invention further relates to a system comprising an electrical device and the sensor device according to the invention. The invention further relates to a method of such a sensor device controlling an electrical device. The invention may preferably relate to the sensor device being a wall-plug. The invention may preferably relate to the electrical device to be a lighting device.

BACKGROUND OF THE INVENTION

Luminaires are traditionally controlled to turn on or off by means wall switches. These switches are installed at predefined locations that are often determined during construction of a building. Installation of such switches, and the possible future remodeling of the installation of such switches, is cumbersome and expensive due to e.g. the rewiring effort. The same applies to other electrical devices in the built environment.

Nowadays, wireless lighting solutions may be controlled by battery powered wireless switches, dedicated apps on portable devices, or by sensors installed in the building. Sensors enable autonomous lighting control. For example, a PIR sensor may be used to detect motion within a space and control the lighting upon detection. PIR sensors are characterized by their wide field of view. Although such a wide field of view is advantageous in many motion detection applications, for observing dedicated areas the PIR sensor needs to be locally masked or shielded, e.g. by inserting shrouds or refocusing the PIR lens. These activities are time-consuming, cumbersome, sub-optimal, and often produce unintended patterns in motion detection.

Hence, there is a clear ongoing need in the lighting domain to find improved alternatives for accurately and intuitively controlling electrical devices in the built environment, preferably such as luminaires, by means of sensors.

SUMMARY OF THE INVENTION

It is an (initial) object of the invention to provide an improved sensor device for controlling an electrical device, preferably a lighting device, which at least alleviates the problems and disadvantages mentioned above. Thereto, the invention provides a sensor device for controlling an electrical device, wherein the sensor device comprises a controller, a pivotable head and a range sensor; wherein the pivotable head houses the range sensor and is configured to be oriented relative to a surface to which the sensor device is mounted in operation; wherein the range sensor is configured to: obtain an orientation of the pivotable head; operate in a first detection mode for detecting an object within a first predetermined distance range from the range sensor when the orientation of the pivotable head is in a first predetermined orientation; wherein the controller is configured to output a control signal arranged for controlling the electrical device upon the range sensor detecting the object. The range sensor may preferably be a Time-of-Flight (ToF) sensor.

Hence, the invention provides a sensor device that is configured to be mounted to a surface in operation. The sensor device may thus be a surface-mountable sensor device. The surface may for example be a wall. The sensor device may for example be mounted to a socket on a wall. In an embodiment, the sensor device may be a wall-plug. For example, the sensor device may be a (wall-) power plug. Controlling may also mean grouping or commissioning in various examples.

In aspects: The object may be one of a plurality of objects, or a control object of a plurality of objects. Thereby, the control object may be different for different detection modes according to the invention.

Due to the pivotable head, which houses the range sensor (e.g. Time-of-Flight sensor), the sensor device is able to provide an adjustable sensing functionality in an orientation relative to the surface. This is an advantage, because the mounting location on the surface (such as e.g. a socket on e.g. a wall) may be leveraged to provide a particular sensing functionality and/or an associated control functionality. Said object may for example be a control object throughout the application.

This particular sensing functionality is namely enabled by the range sensor, for example a time-of-Flight (ToF) sensor. Such a range sensor provides high-performance proximity and ranging sensing. For example, an optical Time-of-Flight sensor may directly measure a distance to an object based on the time in which emitted photons are reflected. The sensor device according to the invention may therefore provide presence sensing and/or motion sensing of an object at a particular distance range, in which the sensing may advantageously be adapted to the orientation of the pivotable head and the range sensor housed therein. Distance range may also comprise the notion of angular distance range throughout the application.

More specifically, the range sensor (and/or associated circuitry thereof) is arranged to obtain the orientation of the pivotable head. When the orientation of the pivotable head is in a first predetermined orientation (i.e. e.g. a first predetermined orientation relative to the surface to which the sensor device is mounted in operation), the range sensor operates in a first detection mode. The first detection mode is characterized by the range sensor being configured to detect an object within a first predetermined distance range from the range sensor. Thus, depending on the orientation of the pivotable head housing the range sensor, the range sensor may enable (range) sensing in a dedicated first predetermined sensing range from the range sensor.

The presence and/or motion of the object, which may be detected within said first predetermined sensing range, may subsequently enable an associated control functionality for controlling the electrical device. The electrical device may for example be a lighting device. The detected object may moreover be a control object. Namely, upon the range sensor detecting the (control) object (when operated in the first detection mode), the controller is configured to output a control signal arranged for controlling the electrical device, e.g. the lighting device. The control signal may further be phrased as a notification signal. The control signal may be conveyed (e.g. wirelessly) to the electrical device via an intermediate device, such as e.g. a bridge or cloud.

Therefore, the sensor device according to the invention advantageously enables a control functionality when oriented to the first predetermined orientation, wherein the detection of the (control) object within the first predetermined distance range may control the operation of the electrical device. For example, the electrical device may be toggled on or off based on a detection of a (control) object within said predetermined distance range. The detection and/or control functionality may thereby be selective regarding the location and orientation of the sensor device.

Consequently, the sensor device according to the invention provides a flexible sensor solution in the built environment, particularly in the lighting domain, that provides an adaptable presence/motion detection via the range sensor and the functionality of a wall-switch. The sensor device according to the invention allows for remote interaction with the sensor device so as to control an electrical device, such as a lighting device.

For example, the sensor device according to the invention may be operated as a (virtual) wall switch. Phrased differently, the sensor device may provide a virtual wall switch for controlling an electrical device, such as a lighting device. Hence, in an embodiment, the first predetermined orientation may be within 30 degrees of the surface; or preferably substantially parallel to the surface.

Consequently, whenever the pivotable head that is housing the range sensor may be oriented substantially parallel to the surface (to which the sensor device is mounted in operation), the range sensor may operate in the first detection mode, which first detection mode is characterized by the range sensor being arranged for detecting a control object within a first predetermined distance range from the range sensor. The first detection mode may thereby be related to a control function, or a commissioning function. This enables the sensor device to function as an intuitive surface-switch, in which the presence and/or motion of the (control) object within said first predetermined distance range may control the electrical device, e.g. a lighting device. As mentioned, said surface may be a wall (onto which the sensor device is mounted in operation).

Furthermore, in an embodiment, the pivotable head may comprise a projection unit configured to project a first user interface on the wall; wherein the first user interface may be indicative of the first predetermined distance range from the range sensor. As such a projection unit may project a first user interface on the surface (to which the sensor device is mounted in operation), the sensor device according to the invention advantageously provides user interface for controlling the electrical device. Since the first user interface may be indicative of the first predetermined distance range, the projected first user interface advantageously provides a clearly visible and intuitive user interface for controlling the electrical device.

In an embodiment, the first predetermined distance range may be discontinuous and may consist of a plurality of first predetermined distance subranges. Such embodiments submit that the first predetermine distance range does not have to be continuous. The first detection mode of the range sensor may namely be configured to perform the sensing in a plurality of discontinuous distance ranges (for example sense between 1 and 2 meter from the range sensor and between 3 and 4 meter from the range sensor, thereby not taking into account the detection between 2 and 3 meter from the range sensor). This is advantageous, because the range sensor may define a tailored and a specific range for detecting the (control) object in the first detection mode, which detection range may hence be used as a user interface for controlling the electrical device.

Moreover, correspondingly, the controller may be configured to output a control signal arranged for controlling the electrical device upon the range sensor detecting the object in the respective predetermined distance subrange.

As mentioned before, the electrical device may be a lighting device. The lighting device may for example be a luminaire, a spotlight, a pixilated spotlight, a fluorescent tube, a projector, a flood light, and/or a bridge. Alternatively, said electrical device may be an actuator, a sensor, a sensor bundle, a speaker, a HVAC system, an electrical door, a heater, a watering system, a refrigerator, a fan, a feeding machine, a security system, a scent diffuser, and/or a window blind.

The sensor device according to the invention may also be oriented to a further orientation, so as to operate the range sensor in a further detection mode, which may be different to the first detection mode. Hence, in an embodiment, the range sensor may be configured to: operate in a second detection mode for detecting the object within a second predetermined distance range from the range sensor when the orientation of the pivotable head is in a second predetermined orientation; wherein the first predetermined orientation may be different to the second predetermined orientation; and/or wherein the first detection mode may be different to the second detection mode.

Moreover, in an embodiment, the second predetermined orientation may be within 30 degrees of a plane perpendicular to the surface; or preferably substantially perpendicular to the surface. Therefore, the first detection mode operated at the first orientation may enable a first function, e.g. a user control function or e.g. a commissioning function, while the second detection mode operated at the second orientation may enable a second function, e.g. a mere presence sensing function. In the proposed embodiment, the second predetermined orientation may be substantially perpendicular to the surface, which may render an advantageous field of view into a space the surface may be surrounding. As mentioned, said surface may be a wall (onto which the sensor device is mounted in operation).

As mentioned before, the electrical device may be a lighting device. The lighting device may for example be a luminaire, a spotlight, a pixilated spotlight, a fluorescent tube, a flood light, and/or a bridge. Alternatively, said electrical device may be an actuator, a sensor, a sensor bundle, a speaker, a HVAC system, an electrical door, a heater, a watering system, a refrigerator, a fan, a feeding machine, a security system, a scent diffuser, and/or a window blind.

Similar to the above, in an embodiment, the pivotable head may comprise a projection unit configured to project a second user interface on a surface aligned with the second predetermined orientation; wherein the second user interface may be indicative of the second predetermined distance range from the range sensor. Similar to the above, in an embodiment, the second predetermined distance range may be discontinuous and may consist of a plurality of second predetermined distance subranges.

In an embodiment, the first detection mode may be related to a user interface function for controlling the electrical device, wherein the second detection mode may be related to a presence (or: motion or: distance) detection function.

The first detection mode may alternatively be related to a commissioning function for commissioning the electrical device, wherein the second detection mode may be related to a presence (or: motion or: distance) detection function. Thus, the sensor device according to the invention may advantageously provide a variety of different functionalities with a single sensor device, wherein said functionalities are switched based on the orientation of the pivotable head.

In an embodiment, the sensor device may comprise a sensing means for measuring the orientation of the pivotable head; wherein the sensing means may be configured to convey the orientation of the pivotable head to the range sensor. Said sensing means may for example be a gyroscope or an accelerometer. The sensing means may for example be comprised within the pivotable head, or a main body of the sensor device, or partially in both. Moreover, the range sensor, such as the Time-of-Flight sensor, may also extract the orientation itself via an associated (e.g. integrated) tilt sensor or a ball tilt sensor.

In an embodiment, the sensor device may comprise an orientation sensor for measuring the orientation of the sensor device relative to gravity. In such an embodiment, the controller may receive said orientation of the sensor device relative to gravity. This allows the controller to know how the sensor device is mounted, e.g. on a standing wall or on a ceiling, etc. This information may be used to finetune the first and/or second predetermined orientation.

Alternatively, in aspects, the orientation sensor may measure and/or retrieve the orientation of the sensor relative to a detection plane. Such information may for example be used to control the layout/shape of a user interface projected by the projection unit on a wall/surface as mentioned before.

In an embodiment, the control signal may comprise an instruction for the lighting device to adapt a lighting characteristic of a light source; wherein the lighting characteristic is one of: an on/off sequence, an intensity, a color, a color temperature, a modulation, a polarization, a beam width, and/or a light scene. Hence, the control signal may be a lighting control signal.

The range sensor may for example operate by means of optical range sensing, radar based range sensing, and/or acoustic range sensing. As mentioned before, the range sensor may be a Time-of-Flight sensor. Alternatively, in examples, directional radar sensors, or direction PIR sensor with limited field of view may also measure distance and qualify as a range sensor.

Moreover, the Time-of-Flight sensor may be enabled for different modalities. In an embodiment, the Time-of-Flight sensor may be one of: an optical Time-of-Flight sensor, an acoustic Time-of-Flight sensor, an IR Time-of-Flight sensor, or a RF based Time-of-Flight sensor. Considering an optical Time-of-Flight sensor, in embodiments, the Time-of-Flight sensor may be one of: an optical single pixel Time-of-Flight sensor, an optical pixel-array Time-of-Flight sensor, an optical pixel-matrix time-of-flight sensor, or an optical triangulation-based sensor.

In an embodiment, the controller may comprise a wireless communication circuit, wherein the wireless communication circuit may be configured to output the control signal via at least one of: Bluetooth, ZigBee, Wi-Fi, NFC, RFID, IR, Lo-Ra, Li-Fi, VLC, RF, and IEEE 802.15.1.

In an alternative and/or additional embodiment, the wired communication circuit may be configured to output the control signal via at least one of: Power Line Communication, ethernet, Fiber Optical Communication, DALI or Coded Mains.

The range sensor may comprise a substantially narrow field of view, such that it may serve as a 'tripwire' in detecting the (control) object. Hence, in an embodiment, the range sensor may comprise a field of view with a top angle less than 35 degrees.

In an embodiment, the control object is one of: a person, a body part, an arm, a hand, a finger, a fingertip, a leg, a foot, a figurine, a gesture, a drone, a door, a window, a furniture, a portable device, or a portable object.

In aspects: The sensor device may comprise a local memory for storing said first and/or second predetermined orientations. The sensor device may be a wall-plug. The sensor device may comprise a power plug for powering and/or mounting the sensor device. For example, the power received by the power plug may power the range sensor (e.g. Time-of-Flight sensor) and the controller. Alternatively, the sensor device may be battery powered. In examples, the sensor device may comprise an electrical actuator to orient the pivotable head. Such an electrical actuator may for example be an electromotor.

In aspects, considering the above, the invention may thus provide for example, a wall-plug for controlling a lighting device, wherein the wall-plug comprises a controller, a pivotable head and a range sensor; wherein the pivotable head houses the range sensor and is configured to be oriented relative to a wall to which the wall-plug is mounted in operation; wherein the range sensor is configured to: obtain an orientation of the pivotable head; operate in a first detection mode for detecting a control object within a first predetermined distance range from the range sensor when the orientation of the pivotable head is in a first predetermined orientation; wherein the controller is configured to output a control signal arranged for controlling the lighting device upon the range sensor detecting the control object. The range sensor may for example be a Time-of-Flight sensor.

It is a further object of the invention to provide an improved (control) system, which at least alleviates the problems and disadvantages mentioned above. Thereto, the invention further provides a system comprising the sensor device according to the invention and an electrical device, wherein the sensor device is configured to control the electrical device in operation. In a further example of the system, the electrical device may be a lighting device. In a further example of the system, the sensor device may be a wall-plug. The advantages and/or embodiments applying to the sensor device according to the invention may also apply mutatis mutandis to the system according to the invention.

For example, the wall-plug may be a wall power-plug. The user interface provided by the range sensor may then advantageously be used to control in operation the electrical device powered via the wall power-plug.

It is a further object of the invention to provide an improved method of a sensor device controlling an electrical device, which at least alleviates the problems and disadvantages mentioned above. Thereto, the invention provides a method of a sensor device controlling an electrical device, wherein the sensor device comprises a controller and a pivotable head housing a range sensor; wherein the method may comprise: orienting the pivotable head relative to a surface to which the sensor device is mounted in operation; obtaining an orientation of the pivotable head; operating the range sensor in a first detection mode for detecting a (control) object within a first predetermined distance range from the range sensor when the orientation of the pivotable head is in a first predetermined orientation; outputting a control signal arranged for controlling the electrical device upon the range sensor detecting the (control) object. The advantages and/or embodiments applying to the sensor device according to the invention may also apply mutatis mutandis to the method according to the invention.

The range sensor may be a Time-of-Flight sensor. In examples, the method may comprise: operating the range sensor in a second detection mode for detecting the (control) object within a second predetermined distance range from the range sensor when the orientation of the pivotable head is in a second predetermined orientation. Thereby, in examples, the first predetermined orientation may be different to the second predetermined orientation; and/or the first detection mode may be different to the second detection mode. In examples, the method may comprise: re-orienting the pivotable head relative to a surface to which the sensor device is mounted in operation. For example, the method may comprise: re-orienting the pivotable head from the first orientation to the second orientation.

In the above embodiments, the sensor device comprises a pivotable head housing a single range sensor, which range sensor may operate in a first detection mode or a second detection mode, depending on the obtained orientation of the pivotable head. However, in alternative aspects of the invention, the pivotable head may house a second (or a further) range sensor. The range sensor may, as mentioned, be a Time-of-Flight sensor.

In aspects: The invention may provide a sensor device according to the invention, wherein the sensor device may comprise a second range sensor; wherein the pivotable head may house the second range sensor; wherein the second range sensor is configured to: obtain the orientation of the pivotable head; operate in a third detection mode for detecting a (control) object within a third predetermined distance range from the second range sensor when the orientation of the pivotable head is in the first predetermined orientation. The object detected by the second range sensor may be a different object to the object detected by the range sensor. The second range sensor may for example also be a Time-of-Flight sensor. The second range sensor may for example be a single pixelated sensor.

In examples, the sensor device may comprise a range unit comprising the first range sensor and the second range sensor, wherein the pivotable head may house the range unit.

Moreover, in examples, the controller may be configured to output a control signal arranged for controlling the electrical device upon the range sensor or the second range sensor detecting the object.

Thereby, in examples, the range sensor may comprise a first field of view, and the second range sensor may comprise a second field of view, wherein the first field of view and the second field of view are different. In examples thereof, the second field of view may be at least partly overlapping the first field of view, or alternatively the second field of view may not be overlapping with the first field of view. Hence, the range sensor and the second range sensor may observe different sections of a space. In further examples, the second field of view may be perpendicular to the first field of view.

For example, the range sensor of the sensor device may for example comprise a first field of view parallel to a wall to which the sensor device is mounted in operation, e.g. to enable a lighting control function by means of providing an intuitive user interface with the first predetermined distance range as exemplified before; while the second range sensor may comprise a second field of view perpendicular to said wall, e.g. to enable a presence detection function by means of detecting objects within the third predetermined distance range.

The operations of the range sensor and second range sensor may moreover interact, thereby providing more functionalities to the sensor device according to the invention. Hence, in examples, the controller may be configured to adapt the first predetermined distance range from the range sensor upon the range sensor detecting the control object within the third predetermined distance range from the second range sensor.

Such an embodiment may for example be advantageous in examples wherein a detection in the third predetermined distance range (e.g. a person being detected within a close proximity to a wall), after which the controller may adjust or set the first predetermined distance range to a more ergonomic user interface in the first orientation (e.g. a user interface substantially parallel or on the wall); or adjust or set the first predetermined distance range to a commissioning mode in the first orientation, in which detection of the (control) object may be used to commission the electrical device. In the latter case, it may be envisioned that e.g. moving a hand (as the control object) up and down the first predetermined distance range may commission optics or beam width of a lighting device (as the electrical device). Other examples may similarly be envisioned.

As partly mentioned before, the sensor device may comprise an orientation sensor for measuring the orientation of the sensor device relative to gravity. A sensor device may thereby be provided according to the invention without requiring a pivotable head, while still fulfilling the object of the invention.

Hence, in a further, similar object of the invention, the invention provides a sensor device for controlling an electrical device, wherein the sensor device comprises a controller and a range sensor; wherein sensor device is configured to be mounted in an orientation relative to gravity; wherein the range sensor is configured to: obtain the orientation of the sensor device relative to gravity; operate in a first detection mode for detecting an object within a first predetermined distance range from the range sensor when the orientation is in a first predetermined orientation; wherein the controller is configured to output a control signal arranged for controlling the electrical device upon the range sensor detecting the object. The range sensor may similarly preferably be a Time-of-Flight (ToF) sensor. The range sensor may be fixedly housed within the sensor device. The advantages and/or embodiments applying to the sensor device according to the initial object of the invention (mentioned above) may also apply mutatis mutandis to the sensor device according to the further object of the invention.

Hence, the invention further, similarly provides a sensor device that is configured to be mounted in an orientation relative to gravity, in operation, for example mounted to a surface. The sensor device may thus be a surface-mountable sensor device. The surface may for example be a wall or ceiling. The sensor device may for example be mounted to a socket on a wall. In an embodiment, the sensor device may be a wall-plug. For example, the sensor device may be a (wall-) power plug. Controlling may also mean grouping or commissioning in various examples.

In aspects: The object may be one of a plurality of objects, or a control object of a plurality of objects. Thereby, the control object may be different for different detection modes according to the invention.

The sensor device of the further object of the invention is thus able to provide an adjustable sensing functionality in an orientation relative to gravity (or phrased: gravitational direction). This is an advantage, because the orientation of the sensor device relative to gravity may be leveraged to provide a particular sensing functionality and/or an associated control functionality.

The sensor device according to the invention may therefore provide presence sensing and/or motion sensing of an object at a particular distance range, in which the sensing may advantageously be adapted to the orientation of the sensor device and the associated range sensor therein.

More specifically, the range sensor (and/or associated circuitry thereof) is arranged to obtain the orientation of the sensor device. When the orientation of the sensor device is in a first predetermined orientation (i.e. e.g. a first predetermined orientation relative to gravity), the range sensor operates in a first detection mode. The first detection mode is characterized by the range sensor being configured to detect an object within a first predetermined distance range from the range sensor. Thus, depending on the orientation of the sensor device and associated range sensor housed therein, the range sensor may enable (range) sensing in a dedicated first predetermined sensing range from the range sensor.

The presence and/or motion of the object, which may be detected within said first predetermined sensing range, may subsequently enable an associated control functionality for controlling the electrical device.

Consequently, the sensor device according to the invention provides a flexible sensor solution in the built environment, particularly in the lighting domain, that provides an adaptable presence/motion detection via the range sensor and the functionality of a wall-switch. The sensor device according to the invention allows for remote interaction with the sensor device so as to control an electrical device, such as a lighting device.

For example, the sensor device according to the invention may be operated as a (virtual) wall switch. Phrased differently, the sensor device may provide a virtual wall switch for controlling an electrical device, such as a lighting device. Hence, in an embodiment, the first predetermined orientation may be within 30 degrees of the gravitational direction; or preferably substantially parallel to the gravitational direction.

Consequently, whenever the sensor device may be oriented substantially parallel to the gravitational direction (in operation), the range sensor may operate in the first detection mode, which first detection mode is characterized by the range sensor being arranged for detecting a control object within a first predetermined distance range from the range sensor. The first detection mode may thereby be related to a control function, or a commissioning function. This enables the sensor device to function as an intuitive surface-switch, in which the presence and/or motion of the (control) object within said first predetermined distance range may control the electrical device, e.g. a lighting device. As mentioned, said surface may be a wall (onto which the sensor device is mounted in operation).

Furthermore, in an embodiment, the sensor device may comprise a projection unit configured to project a first user interface. Said projection may for example be on a surface (e.g. wall) to which the sensor device is mounted in operation. The first user interface may be indicative of the first predetermined distance range from the range sensor. As such a projection unit may project a first user interface on a surface (to which the sensor device may be mounted in operation), the sensor device according to the invention for example advantageously provides user interface for controlling the electrical device. Since the first user interface may be indicative of the first predetermined distance range, the projected first user interface advantageously provides a clearly visible and intuitive user interface for controlling the electrical device.

In an embodiment, the first predetermined distance range may be discontinuous and may consist of a plurality of first predetermined distance subranges. Such embodiments submit that the first predetermine distance range does not have to be continuous. The first detection mode of the range sensor may namely be configured to perform the sensing in a plurality of discontinuous distance ranges (for example sense between 1 and 2 meter from the range sensor and between 3 and 4 meter from the range sensor, thereby not taking into account the detection between 2 and 3 meter from the range sensor). This is advantageous, because the range sensor may define a tailored and a specific range for detecting the (control) object in the first detection mode, which detection range may hence be used as a user interface for controlling the electrical device.

The sensor device according to the invention may also be oriented to a further orientation, so as to operate the range sensor in a further detection mode, which may be different to the first detection mode. Hence, in an embodiment, the range sensor may be configured to: operate in a second detection mode for detecting the object within a second predetermined distance range from the range sensor when the orientation of the sensor device is in a second predetermined orientation; wherein the first predetermined orientation may be different to the second predetermined orientation; and/or wherein the first detection mode may be different to the second detection mode.

Moreover, in an embodiment, the second predetermined orientation may be within 30 degrees of a plane perpendicular to the gravitational direction; or preferably substantially perpendicular to the gravitational direction. Therefore, the first detection mode operated at the first orientation may enable a first function, e.g. a user control function or e.g. a commissioning function, while the second detection mode operated at the second orientation may enable a second function, e.g. a mere presence sensing function. In the proposed embodiment, the second predetermined orientation may be substantially perpendicular to the gravitational direction, which may render an advantageous field of view into a space horizontally. As mentioned, the sensor device may be mounted to a wall (in operation).

In an embodiment, the sensor device may comprise a projection unit configured to project a second user interface on a surface aligned with the second predetermined orientation; wherein the second user interface may be indicative of the second predetermined distance range from the range sensor. Similar to the above, in an embodiment, the second predetermined distance range may be discontinuous and may consist of a plurality of second predetermined distance subranges.

In an embodiment, the first detection mode may be related to a user interface function for controlling the electrical device, wherein the second detection mode may be related to a presence (or: motion or: distance) detection function. The first detection mode may alternatively be related to a commissioning function for commissioning the electrical device, wherein the second detection mode may be related to a presence (or: motion or: distance) detection function. Thus, the sensor device according to the invention may advantageously provide a variety of different functionalities with a single sensor device, wherein said functionalities are switched based on the orientation of the sensor device.

In an embodiment, the sensor device may comprise a sensing means for measuring the orientation of the sensor device; wherein the sensing means may be configured to convey the orientation of the sensor device to the range sensor. Said sensing means may for example be a gyroscope or an accelerometer or a tilt sensor or a ball tilt sensor, etc. The sensor device may thus comprise the sensing means. Alternatively, the range sensor may comprise the sensing means.

It is a further object of the invention to provide an improved method of a sensor device controlling an electrical device, which at least alleviates the problems and disadvantages mentioned above. Thereto, the invention provides a method of a sensor device controlling an electrical device, wherein the sensor device comprises a controller and a range sensor; wherein the method may comprise: orienting the sensor device relative to gravity; obtaining an orientation of the sensor device; operating the range sensor in a first detection mode for detecting a (control) object within a first predetermined distance range from the range sensor when the orientation of the sensor device is in a first predetermined orientation; outputting a control signal arranged for controlling the electrical device upon the range sensor detecting the (control) object. The advantages and/or embodiments applying to the sensor device according to the invention may also apply mutatis mutandis to the method according to the invention.

The range sensor may be a Time-of-Flight sensor. In examples, the method may comprise: operating the range sensor in a second detection mode for detecting the (control) object within a second predetermined distance range from the range sensor when the orientation of the sensor device is in a second predetermined orientation. Thereby, in examples, the first predetermined orientation may be different to the second predetermined orientation; and/or the first detection mode may be different to the second detection mode. In examples, the method may comprise: re-orienting the sensor device relative to gravity. For example, the method may comprise: re-orienting the sensor device from the first orientation to the second orientation. The object may be the same object or a different object. For example, in the first detection mode a body part of a person may be detected in the first predetermined distance range, while in the second detection mode a person as a whole may be detected in the second predetermined distance range.

In the above embodiments, the sensor device comprises a single range sensor, which range sensor may operate in a first detection mode or a second detection mode, depending on the obtained orientation of the sensor device. However, in alternative aspects of the invention, the sensor device may house a second (or a further) range sensor. The range sensor may, as mentioned, be a Time-of-Flight sensor.

In aspects: The invention may provide a sensor device according to the invention, wherein the sensor device may comprise a second range sensor; wherein the second range sensor is configured to: obtain the orientation of the sensor device; operate in a third detection mode for detecting a (control) object within a third predetermined distance range from the second range sensor when the orientation of the sensor device is in the first predetermined orientation. The object detected by the second range sensor may be a different object to the object detected by the range sensor. The second range sensor may for example also be a Time-of-Flight sensor. The second range sensor may for example be a single pixelated sensor.

In examples, the sensor device may comprise a range unit comprising the first range sensor and the second range sensor.

Moreover, in examples, the controller may be configured to output a control signal arranged for controlling the electrical device upon the range sensor or the second range sensor detecting the object.

Thereby, in examples, the range sensor may comprise a first field of view, and the second range sensor may comprise a second field of view, wherein the first field of view and the second field of view are different. In examples thereof, the second field of view may be at least partly overlapping the first field of view, or alternatively the second field of view may not be overlapping with the first field of view. Hence, the range sensor and the second range sensor may observe different sections of a space. In further examples, the second field of view may be perpendicular to the first field of view.

For example, the range sensor of the sensor device may comprise a first field of view parallel to a wall to which the sensor device is mounted in operation, e.g. to enable a lighting control function by means of providing an intuitive user interface with the first predetermined distance range as exemplified before; while the second range sensor may comprise a second field of view perpendicular to said wall, e.g. to enable a presence detection function by means of detecting objects within the third predetermined distance range. The operations of the range sensor and second range sensor may moreover interact, thereby providing more functionalities to the sensor device according to the invention. Hence, in examples, the controller may be configured to adapt the first predetermined distance range from the range sensor upon the range sensor detecting the control object within the third predetermined distance range from the second range sensor. Such an embodiment may for example be advantageous in examples wherein a detection in the third predetermined distance range (e.g. a person being detected within a close proximity to a wall), after which the controller may adjust or set the first predetermined distance range to a more ergonomic user interface in the first orientation (e.g. a user interface substantially parallel or on the wall); or adjust or set the first predetermined distance range to a commissioning mode in the first orientation, in which detection of the (control) object may be used to commission the electrical device. In the latter case, it may be envisioned that e.g. moving a hand (as the control object) up and down the first predetermined distance range may commission optics or beam width of a lighting device (as the electrical device). Other examples may similarly be envisioned.

BRIEF DESCRIPTION OF THE DRAWINGS

The invention will now be further elucidated by means of the schematic non-limiting drawings.

DETAILED DESCRIPTION OF THE EMBODIMENTS

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments of the present invention are provided by way of example so that this disclosure will convey the scope of the invention to those skilled in the art.

As partly mentioned before, there is a clear ongoing need in the built environment, particularly the lighting domain, to find improved alternatives for accurately and intuitively controlling electrical devices by means of sensors, such as controlling lighting devices in e.g. the home and office domain.

Figure 1:
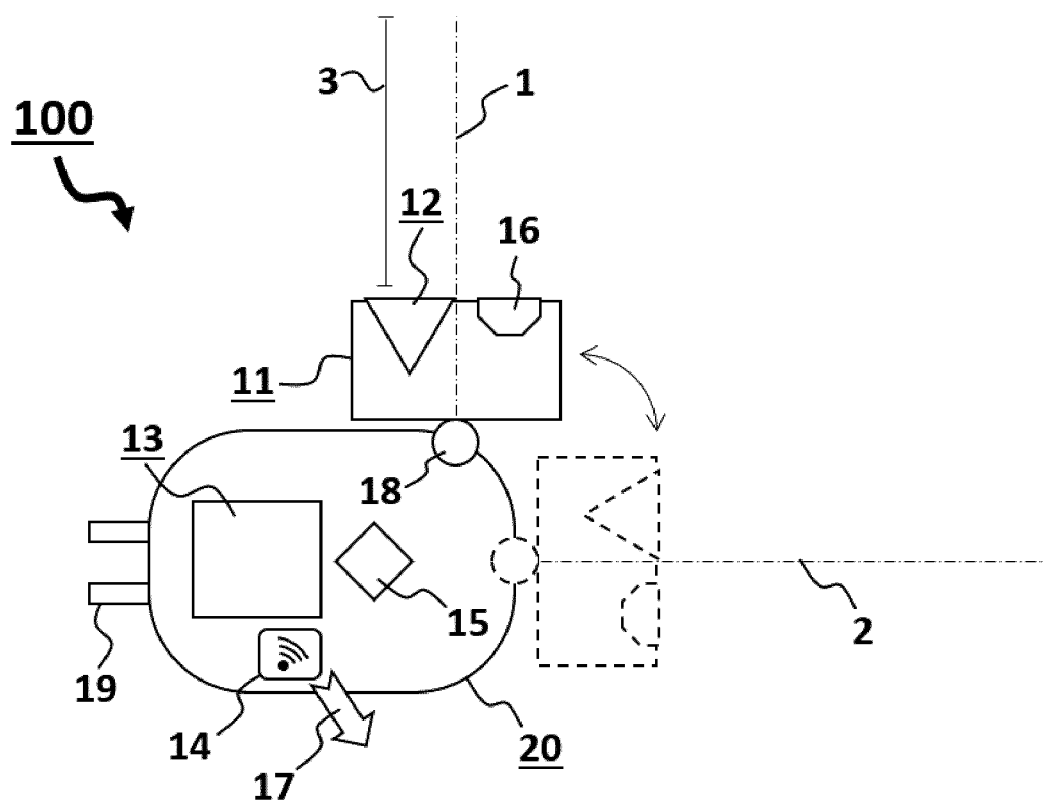
FIG. 1 depicts schematically an embodiment of a sensor device according to the invention.

FIG. 1 depicts schematically, by non-limiting example, an embodiment of a sensor device 100 according to the invention. The sensor device 100 comprises a main body 20, a pivotable head 11, a range sensor 12, a projection unit 16 and a controller 13. The range sensor 12 is a Time-of-Flight sensor 12.

The pivotable head 11 is connected to the main body 20 and arranged to swivel and/or pivot relative to the main body 20 by means of a joint 18. Such re-orientable constructions are well known in the art and not elucidated further. Here, the pivotable head 11 is arranged in a first orientation 1, but may alternatively be moved (or directed) into (the dotted depicted) second orientation 2, either manually or automatically. In the latter case, some alternative examples may be provided in which the pivotable head and/or the main body comprises an electrical actuator such as an electromotor to orient the pivotable head into different orientations. Alternatively, a powered or motorized mirror may be used to direct the projection and/or the optical sensor beam of the range sensor.

The main body 20 comprises the controller 13, a sensing means 15 and a wireless communication circuit 14. The controller 13 is operatively coupled and/or in communication with the sensing means 15 and the wireless communication circuit 14. The sensing means 15 is not necessary to be comprised in the main body 20. The controller 13 is also in communication with the Time-of-Flight sensor 12. The sensing means, the controller, and/or the wireless communication means may alternatively be comprised in the pivotable head itself. The main body 20 further comprises power plugs 19 to electrically and mechanically mount the sensor device 100 to a surface in operation. The surface is a wall. Alternatively, since the power plugs are optional, other means may be envisioned to mount the sensor device to a surface in operation.

Said wall may alternatively be any other surface or plane, such as a ceiling, a floor, a window, a device surface, a furniture, etc. Yet alternatively, said sensor device may receive power from an internal battery as power source. Yet alternatively, said wireless communication circuit may be a communication circuit arranged for wired communication. The projection unit may be optional here. Yet alternatively, the sensor device may e.g. comprise an orientation sensor for measuring the orientation of the sensor device relative to gravity, so as to detect whether the sensor device is mounted horizontal or vertical relative to gravity; alternatively, relative to the surface.

The pivotable head 11 comprises the Time-of-Flight sensor 12 and the projection unit 16. Both are fixedly arranged within the pivotable head 11. As mentioned, the projection unit 16 may be optional. The Time-of-Flight sensor 12 (and/or the projection unit 16) comprises a field of view, which field of view is directed outwards relative to the sensor device 100. Here, the Time-of-Flight sensor 12 is an optical pixel-array Time-of-Flight sensor 12. Alternatively, other Time-of-Flight sensing modalities may be envisioned for the Time-of-Flight sensor, such as an acoustic based ToF-sensor, an IR based ToF-sensor, or an RF based ToF-sensor. The projection unit 16 comprises a light source, such as a LED, OLED, or Pixilated LED light source, or a laser source (e.g. with optics, diffractive elements, etc). The projection unit 16 is configured to project a user interface, such as e.g. a light sheet, a pattern, a color, a modulation, a laser spot, etc.

The sensing means 15 measures how the pivotable head 11 is oriented relative to the main body 20 of the sensor device 100. The sensing means 15 conveys this information, e.g. via the controller 13, to the Time-of-Flight sensor 12. Time-of-Flight sensor 12 is thereby configured to obtain this information and thus the orientation 1,2 of the pivotable head 11. Here, the pivotable head 11 is in a first orientation 1. The Time-of-Flight sensor 12 operates in a first detection mode when the orientation 1,2 of the pivotable head 11 is in a first predetermined orientation 1. Here, the first predetermined orientation 1 matches the actual (schematically depicted) orientation 1 of the pivotable head 11. The first predetermined orientation may for example be perpendicular to said power plugs 19. The first detection mode is characterized by the Time-of-Flight sensor 12 detecting an object (such as a control object) within a first predetermined distance range 3 from the Time-of-Flight sensor 12. Here, the first predetermined distance range 3 is the complete (operational) distance range of the Time-of-Flight sensor.

Furthermore, if the Time-of-Flight sensor 12 detects an object, the controller 14 outputs a control signal 17. The control signal may alternatively be phrased as a notification signal. The control signal 17 may be arranged to control another electrical device. Here, the control signal 17 is arranged to control a lighting device. The control signal 17 is transmitted via the wireless communication circuit 14. The wireless communication circuit 14 may for example comprise a transmitter or transceiver. The wireless communication circuit 14 is configured to output the control signal 17 via ZigBee. Alternatively, said control signal 17 may be outputted via at least one of: Bluetooth, Wi-Fi, NFC, RFID, IR, Lo-Ra, Li-Fi, VLC, RF, and IEEE 802.15.1; or alternatively via wired communication by means of one of: Power Line Communication, ethernet, Fiber Optical Communication, DALI or Coded Mains.

Therefore, the surface-mountable sensor device 100 advantageously enables a first functionality based on the orientation of the pivotable head 11 that is housing the Time-of-Flight sensor relative to that surface. Hence, whenever the pivotable head 11 is oriented to the first predetermined orientation, the detection of a (control) object within the first predetermined distance range 3 may control the operation of said lighting device.

In embodiments, the surface-mountable sensor device 100 may for example be a wall power-plug.

Figure 2:
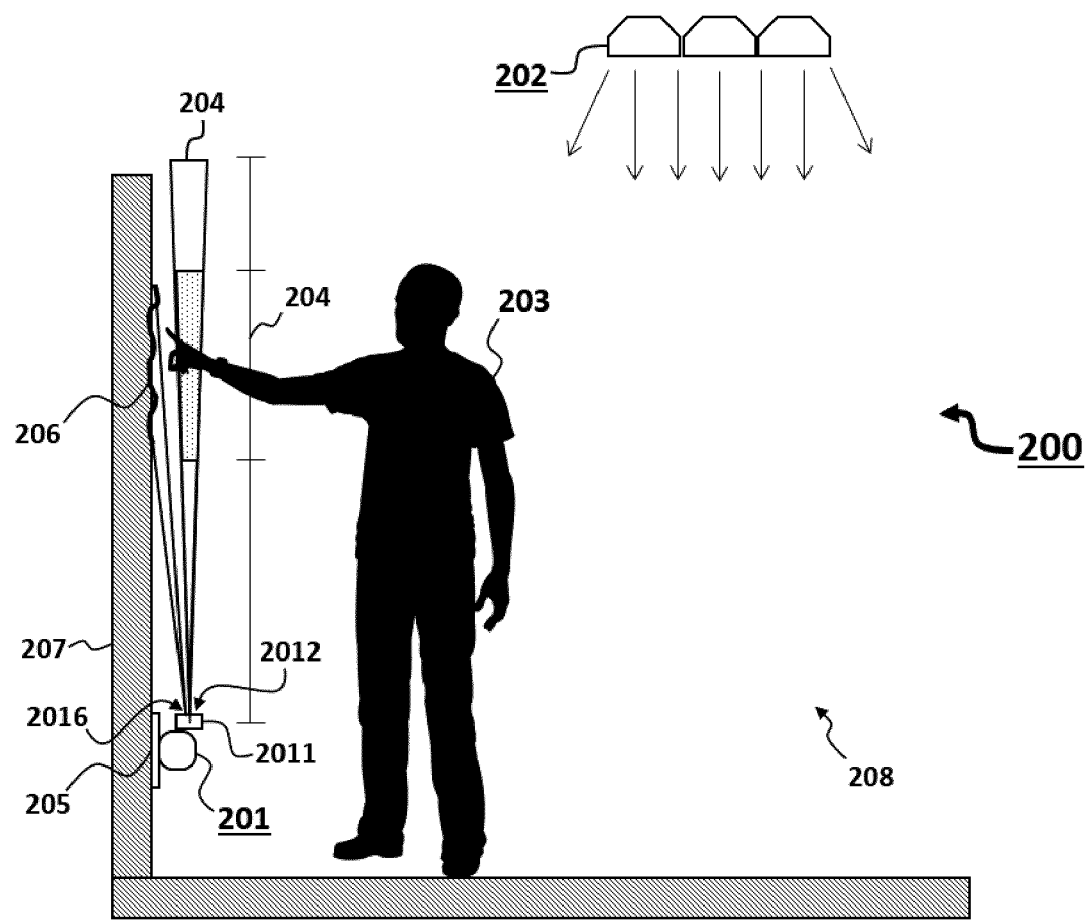
FIG. 2 depicts schematically an embodiment of a system according to the invention comprising a sensor device according to the invention and a lighting device.
Figure 3:
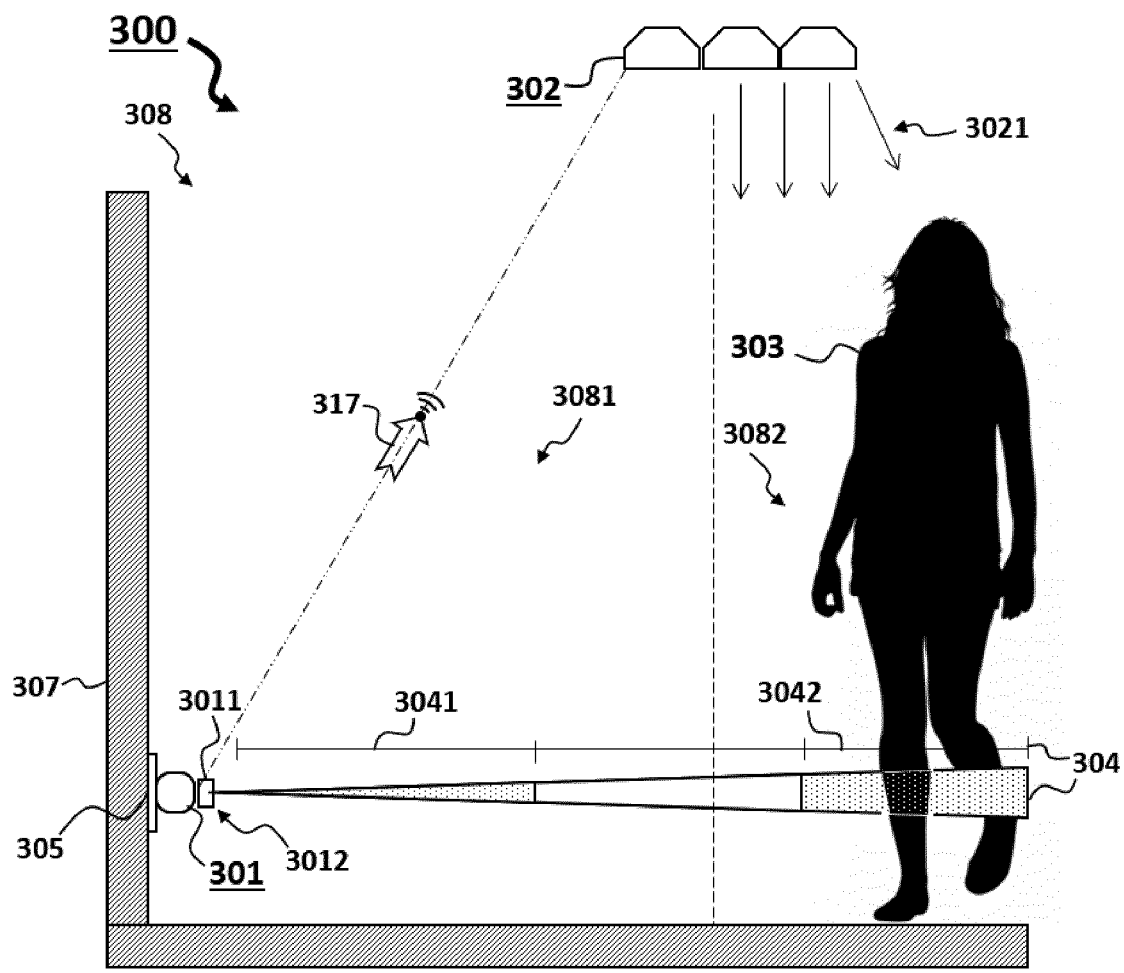
FIG. 3 depicts schematically an embodiment of a system according to the invention comprising a sensor device according to the invention and a lighting device.
Figure 4:
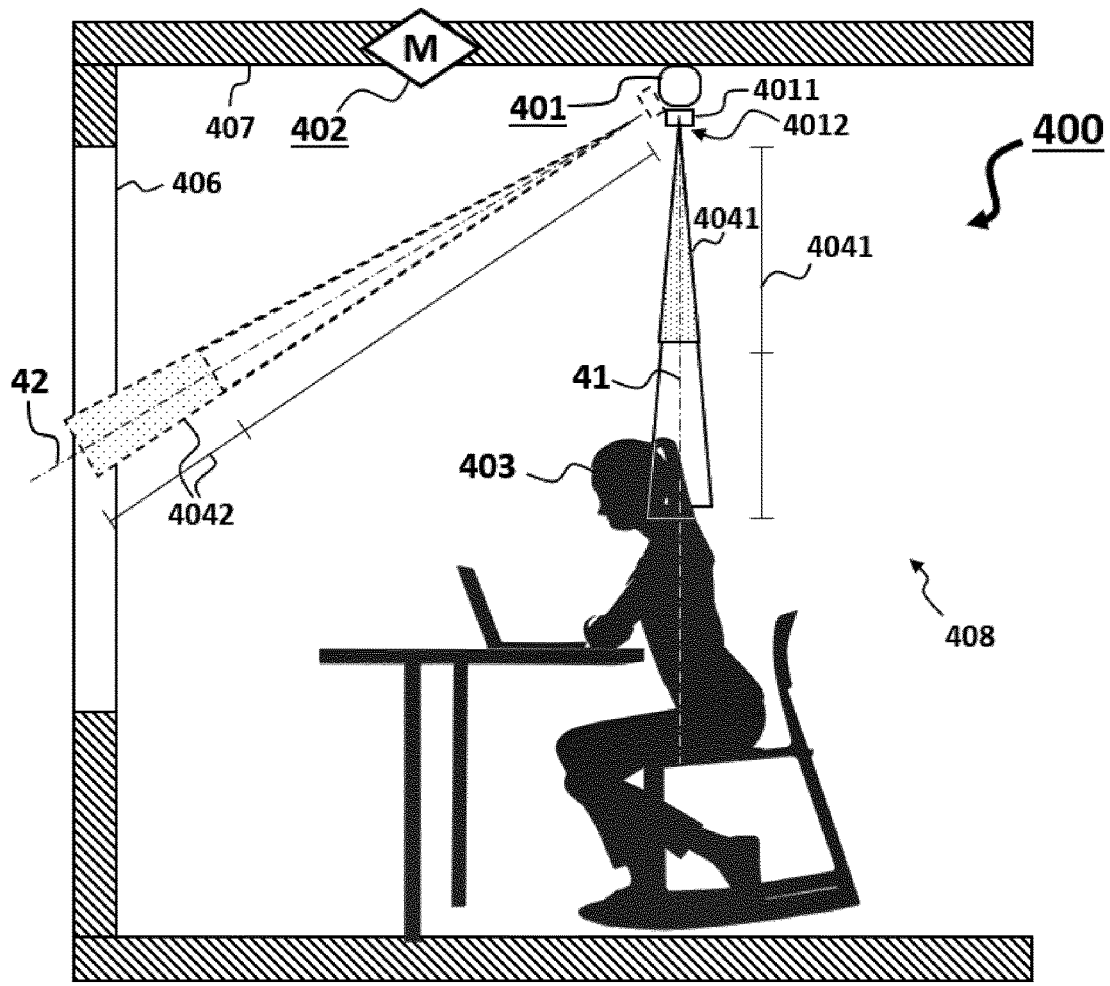
FIG. 4 depicts schematically an embodiment of a system according to the invention comprising a sensor device according to the invention, a lighting device and a building management device.

The sensor device, as depicted in FIG. 1, may be applied in various examples. FIGS. 2 to 4 depict systems comprising a sensor device according to the invention, which is similar to the sensor device according to the embodiment depicted in FIG. 1, and wherein different types of applications of such a sensor device are explained in non-limiting embodiments.

Figure 6:
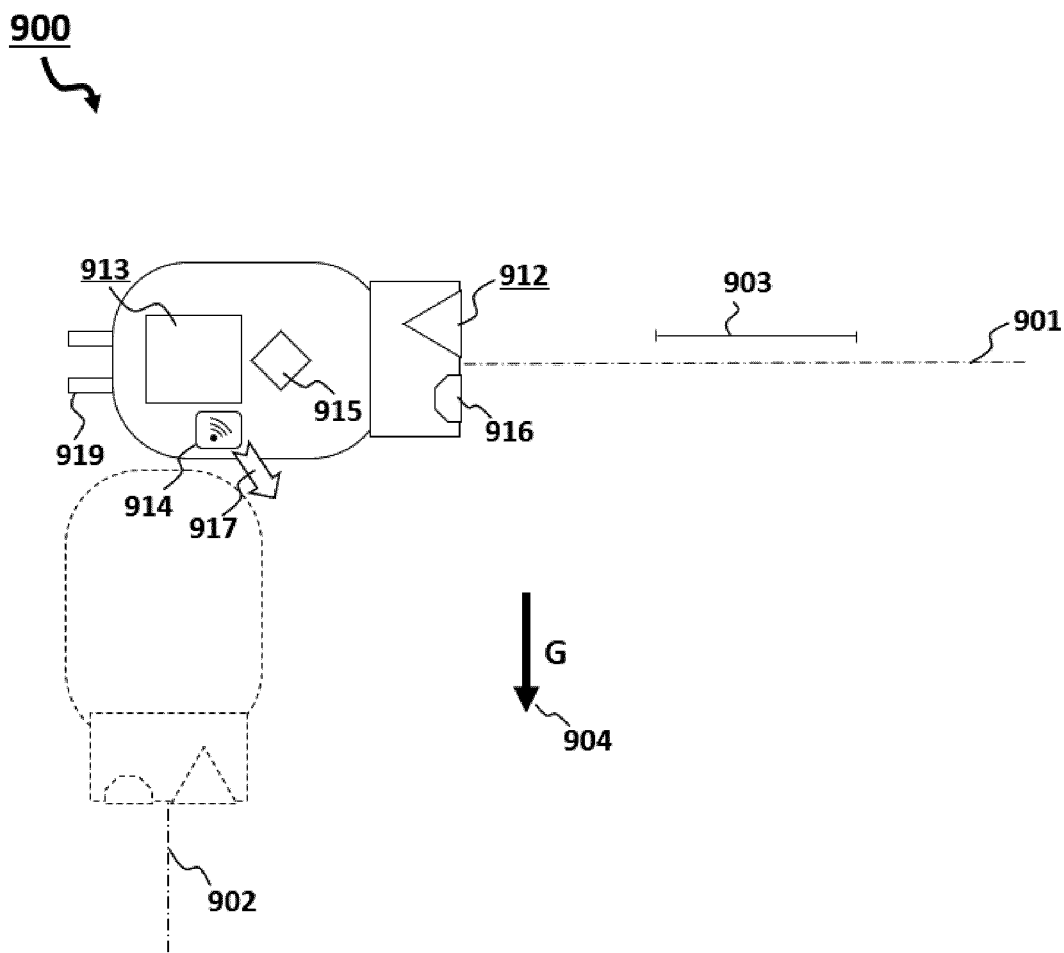
FIG. 6 depicts schematically an embodiment of a sensor device according to the invention.

FIG. 6 depicts schematically, by non-limiting example, an embodiment of a sensor device 900 according to the invention. The sensor device 900 comprises a range sensor 912, a projection unit 916 and a controller 913. The range sensor 912 is a Time-of-Flight sensor 912. The range sensor 912 is, here, fixedly housed within the sensor device 900. Here, the sensor device 900 is arranged in a first orientation 901, but may alternatively be moved (or directed) into (the dotted depicted) second orientation 902. For example, by manual remounting.

The sensor device 900 comprises the controller 913, a sensing means 915 and a wireless communication circuit 914. The controller 913 is operatively coupled and/or in communication with the sensing means 915 and the wireless communication circuit 914. The sensing means 915 may also be comprised within the range sensor 912. The controller 913 is also in communication with the Time-of-Flight sensor 912. The sensor device 900 further comprises power plugs 919 to electrically and mechanically mount the sensor device 900 to e.g. a surface in operation. Such a surface may be a wall, a ceiling, or any other surface.

The sensor device 900 comprises the Time-of-Flight sensor 912 and the projection unit 916. As partly mentioned before, both are fixedly arranged within the sensor device 900. As mentioned, the projection unit 916 may be optional. The wireless communication circuit 914 may alternatively be a wired communication circuit, e.g. operating with PLC. The Time-of-Flight sensor 912 (and/or the projection unit 916) comprises a field of view, which field of view is directed outwards relative to the sensor device 900. Here, the Time-of-Flight sensor 912 is an optical pixel-array Time-of-Flight sensor 912. Alternatively, other Time-of-Flight sensing modalities may be envisioned for the Time-of-Flight sensor, such as an acoustic based ToF-sensor, an IR based ToF-sensor, or an RF based ToF-sensor. The projection unit 916 comprises a light source, such as a LED, OLED, or Pixilated LED light source, or a laser source (e.g. with optics, diffractive elements, etc). The projection unit 916 is configured to project a user interface, such as e.g. a light sheet, a pattern, a color, a modulation, a laser spot, etc.

The sensing means 915 measures how the sensor device 900 is oriented relative to gravity 904. The sensing means 915 conveys this information, e.g. via the controller 913, to the Time-of-Flight sensor 912. Alternatively, the sensing means may convey this information to the controller, and the controller may operate the Time-of-Flight sensor, wherein in such alternative the controlling circuitry of the Time-of-Flight sensor is partly integrated with the controller. Time-of-Flight sensor 912 is thereby configured to obtain this information and thus the orientation 901, 902 of the sensor device 900.

Here, the sensor device 900 is in a first orientation 901. The first orientation 901 is here substantially perpendicular to gravity 904. The Time-of-Flight sensor 912 operates in a first detection mode when the orientation 901, 902 of the sensor device 900 is in a first predetermined orientation. Here, the first predetermined orientation is within 30 degrees of (e.g. a plane perpendicular to) the gravitational direction 904. Therefore, the actual (schematically depicted) orientation 901 of the sensor device 900 matches (falls within) the first predetermined orientation. The first detection mode is characterized by the Time-of-Flight sensor 912 detecting an object (such as a control object) within a first predetermined distance range 903 from the Time-of-Flight sensor 912. Here, the first predetermined distance range 903 is only a (schematically indicated) middle portion of the range of the Time-of-Flight sensor, but may alternatively be the complete (operational) distance range of the Time-of-Flight sensor.

Furthermore, if the Time-of-Flight sensor 912 detects an object, the controller 914 outputs a control signal 917. The control signal may alternatively be phrased as a notification signal. The control signal 917 may be arranged to control another electrical device. Here, the control signal 917 is arranged to control a lighting device. The control signal 917 is transmitted via the wireless communication circuit 914. The wireless communication circuit 914 may for example comprise a transmitter or transceiver. The wireless communication circuit 914 is configured to output the control signal 917 via ZigBee. Alternatively, said control signal 17 may be outputted via at least one of: Bluetooth, Wi-Fi, NFC, RFID, IR, Lo-Ra, Li-Fi, VLC, RF, and IEEE 802.15.1; or alternatively via wired communication, e.g. via the power plugs 919, by means of one of: Power Line Communication, ethernet, Fiber Optical Communication, DALI or Coded Mains.

Therefore, the surface-mountable sensor device 900 advantageously enables a first functionality based on its orientation relative to gravity 904. Hence, whenever the sensor device 900 is oriented to the first predetermined orientation, the detection of a (control) object within the first predetermined distance range 903 may control the operation of said lighting device (or alternatively a electrical device as mentioned). In embodiments, the surface-mountable sensor device 900 may for example be a wall power-plug.

The sensor device, as depicted in FIG. 6, may be applied in various examples. The examples of FIGS. 2 to 4 may mutatis mutandis be applied with the sensor device as depicted in FIG. 6. That is, the orientations and functionalities of the re-orientable pivotable head may be mutatis mutandis replaced by the re-orientation of the sensor device relative to gravity, so as to operate in the first and/or second operation mode. FIGS. 2 to 4 namely depict systems comprising a sensor device according to the invention, which is similar to the sensor device according to the embodiment depicted in FIG. 1, buy may alternatively thus be the sensor device as depicted in FIG. 6.

FIG. 2 depicts schematically an embodiment of a system 200 according to the invention. The system 200 comprises a sensor device 201 according to the invention, which sensor device 201 is similar to the sensor device depicted in FIG. 1.

The system 200 further comprises a lighting device 202. The lighting device 202 is a powered luminaire. The lighting device 202 comprises wireless connectivity and is controllable by means of wireless control commands. Here, the sensor device 201 comprises a wireless communication circuit operating with ZigBee, and the connectivity of the lighting device 202 also operates with ZigBee. The lighting device 202 may for example comprise a Bluetooth-Zigbee combo-chip. Other wireless communication modalities, as mentioned before, may alternatively be chosen and/or envisioned.

The sensor device 201 is a wall-plug. The sensor device 201 is plugged into a socket 205 on the wall 207 of a space 208. The lighting device 202 is also arranged in the space 208 and is configured to illuminate said space 208 in operation. A person 203 is furthermore present within the space 208.

Still referring to FIG. 2, the sensor device 201 may provide a virtual wall switch that is configured to control the lighting device 202, which may be operated by gestures of the person 203. The sensor device 201 is thus configured to control the lighting device 202. The pivotable head 2011 of the sensor device 201 is oriented substantially parallel to the wall 207. The first predetermined orientation of the pivotable head 2011 is within thirty degrees of the wall 207 onto which the sensor device 201 is mounted. Thus, since the pivotable head 2011 of the sensor device 201 is oriented substantially parallel to the wall 207, the Time-of-Flight sensor 2012 is in the first predetermined orientation and will operate in the first detection mode.

The first detection mode is characterized by the Time-of-Flight sensor 2012 being arranged for detecting an object, i.e. a control object, within a first predetermined distance range 204 from the Time-of-Flight sensor 2012. The figure (i.e. 2) shows the Field-of-View of the Time-of-Flight sensor 2012 and the range limited part (predetermined distance range) is thereby indicated with 204. In the present embodiment, the first predetermined distance range 204 is a distance range between eighty centimeter and hundred twenty centimeter from the Time-of-Flight sensor 2012. Other metric values of such ranges may be envisioned desirably for other embodiments.

Hence, in the first detection mode of the Time-of-Flight sensor 2012, the Time-of-Flight sensor 2012 is arranged to detect an object within (only) the first predetermined distance range 204. That is: the (distance) window between eighty and hundred twenty centimeters from the Time-of-Flight sensor.

The pivotable head 2011 of the sensor device 201 also comprises a projection unit 2016. Such a projection unit is also described in the section referring to FIG. 1. The projection unit 2016 projects a first user interface 206 on the wall 207 that is indicative of the first predetermined distance range 204. Namely, as presently depicted, the first user interface 206 matches the first predetermined distance range 204 from the Time-of-Flight sensor 2012. The first user interface 206 is thereby a light pattern projected on the wall 207, but may alternatively be any other visual cue projected on the wall. The first user interface 206 enables the person 203 to visually observe an indication of the current detection range in which the Time-of-Flight sensor 2012 is operating, i.e. the first predetermined distance range 204.

Here, the hand of the person 203 serves as the control object. Whenever the person 203 brings its hand to the first user interface 206, the Time-of-Flight sensor 2012 in the sensor device 201 detects the hand of the person 203 within the first predetermined distance range 204.

Upon the Time-of-Flight sensor 2012 detecting the hand of the person 203 within the first predetermined distance range 204, the controller of the sensor device 201 outputs a wireless control signal to control the lighting device 202. Here, the wireless control signal comprises an instruction for the lighting device 202 to turn on (if its currently off) or to turn off (if its currently on). Hence, as partly mentioned, the sensor device 201 according to the invention provides a virtual wall switch functionality to the lighting device 202, hence provides an improved system for intuitively controlling the lighting device 202 (i.e. on/off toggling). Alternatively, the control object may be any other body part of the person, or a dedicated portable device, or a portable item. Yet alternatively, the control signal may comprise an instruction for the lighting device to adapt a lighting characteristic of a light source; wherein the lighting characteristic is one of: an on/off sequence, an intensity, an illumination direction, a color, a color temperature, a modulation, a polarization, a beam width, and/or a light scene. The control command may also comprise an instruction to adapt optics, or to store (current) settings of the lighting device.

More intuitive user interface actions may moreover be envisioned as an alternative, for example the moving the hand up and down, i.e. changing the distance to the Time-of-Flight sensor, may provide dimming up and down, toggling colors, or changing light spectrum of the lighting device. Hand rotations or finger movements may also be detected and associated with user interface command gestures. The first predetermine distance range may be adapted to provide various different user control options, and the corresponding first user interface may be adapted in accordance therewith. For example, various predetermined distance subranges may be defined within the first operation mode of the Time-of-Flight sensor, wherein each predetermined distance subrange may serve as a button for a control functionality of the lighting device.

All in all, still referring to the embodiment of the system 200 depicted in FIG. 2, and partly referring to the sensor device depicted in FIG. 1, the sensor device 201 is able to provide an adjustable sensing functionality in an orientation relative to the wall 207. This is an advantage, because the location of the socket 205 on the wall 207 may be leveraged to provide the mentioned control functionality of the lighting device 202. Thus, the invention enables the sensor device 201 to function as an intuitive wall-switch, in which the presence and/or motion of the hand of the person 203 within said first predetermined distance range 204 may control the lighting device 202. The sensing (i.e. the detection mode) of the Time-of-Flight sensor 2012 is namely adapted to the orientation of the pivotable head 2011.

In embodiment, not depicted in the figures, a system is provided comprising the sensor device according to the embodiment depicted in FIG. 2, a luminaire (as the lighting device depicted in FIG. 2), and a presence sensor. The presence sensor may e.g. be a PIR sensor, and may e.g. be integrated in the luminaire or be standalone. The presence sensor may detect a presence of a person, and trigger the luminaire to turn on. The luminaire and/or the presence sensor are in communication with the sensor device according to the invention. Upon the luminaire turning on by means of the trigger of the presence sensor, the sensor device may also be triggered on. The sensor device may thereby operate in a first operational mode, when the sensor device is oriented parallel to the wall and projects a first user interface indicative of the first predetermined distance range, as described in the embodiment of FIG. 2. Hence, upon the presence detector triggering the luminaire to turn on, the sensor device according to the invention may be turned on as well to enable a user interface on the wall for intuitively further controlling the properties and characteristics of the luminaire, such as intensity, color, modulation, direction, color temperature, etc.

In alternative embodiments thereof, the presence sensor described here may be a second Time-of-Flight sensor in a further sensor device according to the invention. Yet alternatively, this second Time-of-Flight sensor may be housed in the same pivotable head of the initially mentioned sensor device, for example perpendicular to the first Time-of-Flight sensor (i.e. the field of views of said Time-of-Flight sensors being perpendicular to one another), such that the first Time-of-Flight sensor in combination with the projection unit provides a control functionality to the luminaire, whereas the further Time-of-Flight sensor enables a presence detection functionality to the luminaire. Yet alternatively, based on the detection of the second Time-of-Flight sensor of a further sensor device, the projected first user interface and/or the first predetermined distance range may be adapted.

FIG. 3 depicts schematically an embodiment of a system 300 according to the invention. The system 300 comprises a sensor device 301 according to the invention, which sensor device 301 is similar to the sensor device depicted in FIG. 1. The system 300 further comprises a lighting device 302. The lighting device 302 is a powered directional luminaire. The lighting device 302 comprises wireless connectivity and is controllable by means of wireless control commands. Here, the sensor device 301 comprises a wireless communication circuit operating with Wi-Fi, and the connectivity of the lighting device 302 also operates with Wi-Fi. Alternative wireless communication modes may also be envisioned as mentioned before. The lighting device may alternatively be any other electrical device, e.g. providing a directional service to the space.

The sensor device 301 is a wall-plug. The sensor device 301 is plugged into a socket 305 on the wall 307 of a space 308. The space 308 may for example be a corridor, or open office space. The space 308 is (virtually) subdivided in a first subspace 3081 ('left side') and a second subspace 3082 ('right side'). The lighting device 302 is also arranged in the space 308 and is configured to illuminate said space 308 in operation. Since the lighting device 302 is a directional luminaire, the lighting device 302 can either illuminate the space 308 completely, or illuminate only the first subspace 3081, or illuminate only the second subspace 3082. A person 303 is furthermore walking within the space 308.

Still referring to FIG. 2, the sensor device 301 provides a presence sensing functionality. Since the sensor device 301 is plugged into the socket 305, the invention may leverage the location of the socket 305 to provide a 'virtual tripwire' application to enable said presence sensing functionality. Here, the pivotable head 3011 of the sensor device 301 does not comprise the optional projection unit as depicted in FIG. 1.

The sensor device 301 is thus configured to control the lighting device 302. The pivotable head 3011 of the sensor device 301 is oriented substantially perpendicular to the wall 307. The first predetermined orientation of the pivotable head 3011 is within thirty degrees of a plane perpendicular the surface (i.e. the wall 307) onto which the sensor device 301 is mounted. Alternatively, the sensor device may also control and/or group a set of connected luminaires that are commissioned to the location illuminating the desired subspace.

Thus, since the pivotable head 3011 of the sensor device 301 is oriented substantially parallel to the wall 307, the Time-of-Flight sensor 3012 is in the first predetermined orientation and will operate in the first detection mode. The first detection mode is characterized by the Time-of-Flight sensor 3012 being arranged for detecting an object (or: a control object) within a first predetermined distance range 304 from the Time-of-Flight sensor 3012. Here, the first predetermined distance range 304 is discontinuous and comprises two separate predetermined distance subranges 3041, 3042. The first distance subrange 3041 is between zero meter and one meter from the Time-of-Flight sensor 3012, whereas the second distance subrange 3042 is between two meter and three meter from the Time-of-Flight sensor 3012. Other metric values of such ranges, and/or other subdivisions of the first predetermined distance range, may be envisioned desirably and accordingly.

Hence, in the first detection mode of the Time-of-Flight sensor 3012, the Time-of-Flight sensor 3012 is arranged to detect an object within (only) the first predetermined distance range 304. Here, the body of the person 303 serves as the (control) object to be detected. In particular the feet and legs of the person 303. Whenever the person 303 walks into the first predetermined distance range, the Time-of-Flight sensor 3012 in the sensor device 301 detects the person 303 within the first predetermined distance range 304. More specifically, whenever the person 303 walks into the first distance subrange 3041, the Time-of-Flight sensor 3012 detects the person 303 within the first distance subrange 3041. Alternatively, and/or additionally, the Time-of-Flight may also measure a walking direction and/or walking speed of the person. Similarly, whenever the person 303 walks into the second distance subrange 3042, the Time-of-Flight sensor 3012 detects the person 303 within the second distance subrange 3042. This is the advantageous character of a Time-of-Flight sensor, which may sense the object per se, but also in which range the object is detected. The range outside these subranges is not used for object detection in the depicted present embodiment.

Upon the Time-of-Flight sensor 3012 detecting the person 303 within the first predetermined distance range, and as depicted in FIG. 3 explicitly within the second distance subrange 3042, the controller of the sensor device 301 outputs a wireless control signal 317 to control the lighting device 302. Said control signal may alternatively be conveyed to the lighting device via an intermediate device such as a bridge. Here, the wireless control signal 317 comprises an instruction for the lighting device 302 to increase the intensity of light sources comprised within the lighting device 302 that only directionally illuminate the second subspace 3082 with a directional light 3021. This advantageously enables the illumination of only that space in which the person 303 is detected to be present. In alternative examples, the control signal may be arranged to control optics or orientations of the lighting device, so as to provide directional lighting.

Oppositely, upon the Time-of-Flight sensor 3012 detecting the person 303 within the first distance subrange, the controller of the sensor device 301 may output a wireless control signal comprising an instruction for the lighting device 302 to increase the intensity of light sources comprised within the lighting device 302 that only directionally illuminate the first subspace 3081.

Hence, as partly mentioned, the sensor device 301 according to the invention provides a presence detection ('trip wire') functionality to the lighting device 302, hence provides an improved system for intuitively controlling the directionality of light emitted by the lighting device 302.

In embodiment, not depicted in the figures, a system is provided similar to the system depicted in FIG. 3, but wherein the space is a bedroom. A bed is positioned in the range spanned between the first distance subrange and the second distance subrange. Hence, the first distance subrange is associated with the left side of the bed, whereas the second distance subrange is associated with the right side of the bed. The Time-of-Flight sensor of the sensor device according to the invention may therefore detect whether a person steps out of bed on the left side or the right side of the bed. The same applies for entering the bed. The controller of the sensor device subsequently controls a lighting device, such as a night light, or alternatively any other electrical device within the bedroom based on the respective detection. The controller may e.g. control a lighting device on the left side of the bed whenever the person is detected on the left side of the bed. Or: the controller may e.g. control a speaker or radio to turn off whenever the person is detected initially on the right side of the bed and then not detecting the person there anymore, indicating the person entering into bed or leaving the bedroom. Similar applications and examples may be envisioned. For example: Alternatively, and/or additionally, mutatis mutandis, the sensor device may also be suited to detect sitting up and laying down in bed itself, e.g. detecting sitting up so as to control the lights to turn on and laying down to control the lights to turn off.

FIG. 4 depicts schematically, by non-limiting example, a system 400 according to the invention. The system 400 comprises a sensor device 401 according to the invention, which sensor device 401 is similar to the sensor device depicted in FIG. 1. However, here the sensor device 401 does not comprise the (optional) projection unit in the pivotable head 4011; and the Time-of-Flight sensor 4012 of the sensor device 401 is configured to operate in a second detection mode.

The sensor device 401 is mounted to the ceiling 407 of a room 408. The room has a window 406. The sensor device 401 is powered externally, but may alternatively be battery powered. The sensor device may alternatively be mounted on the wall, or any other surface in the room. The sensor device 402 may yet alternatively, for example, be mounted to a surface of a luminaire on said ceiling. The room 408 is an office comprising a desk and a chair. A person 403 may walk in the room 408 and work at the desk sitting on the chair. The person 403 may also stand up occasionally and stretch, or even leave the room 408. The sensor device 401 is mounted above the desk.

The system 400 further comprises a building management device 402. The building management device 402 manages devices (not depicted) within the room 408, such as a lighting device, a HVAC device, a heating device, a fan, a window blind, a speaker, a robot cleaner, etc. The building management device 402 is in communication with the sensor device 401 by means of a wired connection, but may alternatively be in wireless communication with said sensor device 401, e.g. via the wireless modalities mentioned before. The building management device 402 is thereby able to receive control commands and/or notification signals from the sensor device 401.

Here, the pivotable head 4011 of the sensor device 401 may be oriented differently during daytime and nighttime by either manual adjustment or by automated actuation thereof, e.g. wherein the sensor device 401 comprises an electromotor or piezo-actuator to adapt orientation of the pivotable head 4011. Other times and use cases may similarly be envisioned.

Referring to FIG. 4, the person 403 is sitting on the chair, at the desk, within the room 408. During daytime, the pivotable head 4011 of the sensor device 401 is oriented downwards, substantially perpendicular to the ceiling 407 to which the sensor device 401 is mounted. The desk is thereby in the field of view of the Time-of-Flight sensor 4012. As a result, the pivotable head 4011 is in a first orientation 41 during daytime. The Time-of-Flight sensor 4012 operates in a first detection mode when the orientation 41,42 of the pivotable head 4011 is in the first predetermined orientation 41. Here, the first predetermined orientation matches the actual (schematically depicted) orientation 41 of the pivotable head 4011.

Therefore, the Time-of-Flight sensor 4012 operates in the first detection mode. The first detection mode is characterized by the Time-of-Flight sensor 4012 detecting an object within a first predetermined distance range 4041 from the Time-of-Flight sensor 4012. The first predetermined distance range 4041 is a distance range between zero and hundred centimeter from the Time-of-Flight sensor 4012. Other metric values of such ranges may be envisioned desirably for alternative examples. Consequently, in the first detection mode of the Time-of-Flight sensor 4012, the Time-of-Flight sensor 4012 is arranged to detect an object within (only) the first predetermined distance range 4041.

This means that whenever the person 403 stands up, the head (i.e. the object) of the person 403 will be detected by the Time-of-Flight sensor 4012 within the first predetermined distance range 4041. The Time-of-Flight sensor 4012 is thereby able to detect persons standing up. Moreover, upon the Time-of-Flight sensor 4012 detecting the head of the person 403 within the first predetermined distance range 4041, the controller of the sensor device 401 outputs a wireless notification signal to the building management device 402. The building management device 402 may control the room 408 accordingly based on this information. For example, the building management device 402 may control a lighting device within the room 408 to be turned to ambient lighting when the person 403 is detected to stand up, and/or to be turned to task lighting when the person 403 is detected to sit down. Color temperature may alternatively be adjusted.

Again, referring to FIG. 4, during nighttime, the pivotable head 4011 of the sensor device 401 is oriented in the direction of the window 406. The window 406 is therefore in field of view of the Time-of-Flight sensor 4012. The Time-of-Flight sensor 4012 operates in a second detection mode when the orientation 41, 42 of the pivotable head 4011 is in the second predetermined orientation 42. Here, the second predetermined orientation matches the actual (schematically depicted) orientation 42 of the pivotable head 4011.

Therefore, the Time-of-Flight sensor 4012 operates in the second detection mode. The second detection mode is characterized by the Time-of-Flight sensor 4012 detecting an object within a second predetermined distance range 4042 from the Time-of-Flight sensor 4012. The second predetermined distance range 4042 is a distance range between two meter and two-and-a-half meter from the Time-of-Flight sensor 4012. Other metric values of such ranges may be envisioned desirably for alternative examples. Consequently, in the first detection mode of the Time-of-Flight sensor 4012, the Time-of-Flight sensor 4012 is arranged to detect an object within (only) the second predetermined distance range 4042.

This means that whenever an intruder (i.e. the object) enters through the window 402, the intruder will be detected by the Time-of-Flight sensor 4012 within the second predetermined distance range 4042. Since the second predetermined distance range is tailored to the window 406, the sensor device 401 according to the invention provides an accurate and robust intruder detection functionality. The Time-of-Flight sensor 4012 is thus able to detect intruders through the window 406.

Hence, the sensor device 401 according to the invention provides an intruder/presence detection functionality to the building management device 402 and provides a body gesture detection functionality to the building management device 402, based on the orientation of the pivotable head 4011.

Alternatively, instead of intruder detection, the pivotable head of the sensor device may be oriented to a door, and people entering through a door may be detected and consequently counted, so as to provide applications based on people count, such as HVAC control of the room.

Figure 5:
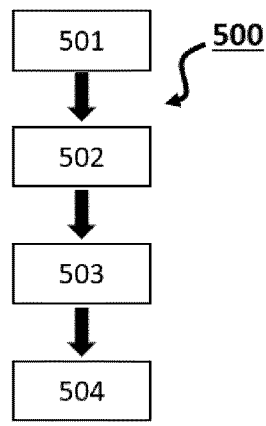
FIG. 5 depicts schematically a method according to the invention.

FIG. 5 depicts schematically, by non-limiting example, a method 500 of a sensor device controlling an electrical device according to the invention. Thus, the sensor device comprises a controller and a pivotable head housing a Time-of-Flight sensor. The sensor device may be similar to the sensor device as depicted in FIGS. 1 to 4. The method comprises a step 501 of orienting the pivotable head relative to a surface to which the sensor device is mounted in operation. The method 500 comprises a next step 502 of obtaining an orientation of the pivotable head, and a step 503 of operating the Time-of-Flight sensor in a first detection mode for detecting a (control) object within a first predetermined distance range from the Time-of-Flight sensor when the orientation of the pivotable head is in a first predetermined orientation. The method 500 comprises a further step 504 of outputting a control signal arranged for controlling the electrical device upon the Time-of-Flight sensor detecting the (control) object.

Figure 7:
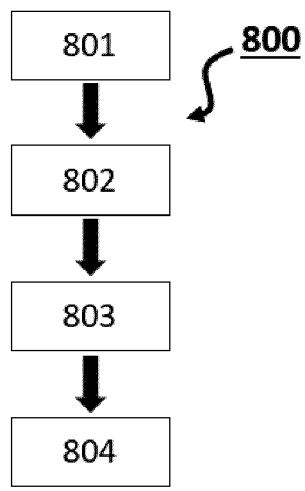
FIG. 7 depicts schematically a method according to the invention.

FIG. 7 depicts schematically, by non-limiting example, a method 800 of a sensor device controlling an electrical device according to the invention. Thus, the sensor device comprises a controller and a Time-of-Flight sensor. The sensor device may e.g. be similar to the sensor device as depicted in FIG. 6. The method 800 comprises a step 801 of orienting the sensor device relative to gravity in operation. The method 800 comprises a next step 802 of obtaining an orientation of the sensor device, and a step 803 of operating the Time-of-Flight sensor in a first detection mode for detecting a (control) object within a first predetermined distance range from the Time-of-Flight sensor when the orientation of the sensor device is in a first predetermined orientation. The method comprises a further step 804 of outputting a control signal arranged for controlling the electrical device upon the Time-of-Flight sensor detecting the (control) object. In examples, the first predetermined orientation is within 30 degrees of the gravitational direction. In examples, the method may further comprise a step of operating the Time-of-Flight sensor in a second operation mode for detecting the same (control) object, or another (control) object. The second predetermined orientation may for example be within 30 degrees of a plane perpendicular to the gravitational direction.

The invention claimed is:

1. A sensor device for controlling an electrical device, the sensor device configured to be mounted in an orientation relative to gravity, the sensor device comprising:
   a controller; and
   a range sensor;
   wherein the range sensor is configured to:
      obtain the orientation of the sensor device relative to gravity;
      operate in a first detection mode for detecting an object within a first predetermined distance range from the range sensor when the orientation is in a first predetermined orientation; and
      operate in a second detection mode for detecting the object within a second predetermined distance range from the range sensor when the orientation is in a second predetermined orientation;
   wherein the first predetermined orientation is different to the second predetermined orientation, the first detection mode is different to the second detection mode, and the controller is configured to output a control signal arranged for controlling the electrical device upon the range sensor detecting the object.

2. The sensor device according to claim 1, wherein the sensor device is a wall-plug.

3. The sensor device according to claim 1, wherein the range sensor is a Time-of-Flight sensor.

4. The sensor device according to claim 1, wherein the first predetermined orientation is within 30 degrees of a gravitational direction.

5. The sensor device according to claim 1, wherein the sensor device comprises a projection unit configured to project a first user interface on a surface; and
   wherein the first user interface is indicative of the first predetermined distance range from the range sensor.

6. The sensor device according to claim 1, wherein the first predetermined distance range is discontinuous and consists of a plurality of first predetermined distance subranges.

7. The sensor device according to claim 1, wherein the second predetermined orientation is within 30 degrees of a plane perpendicular to the gravitational direction.

8. The sensor device according to claim 1, wherein the first detection mode is related to a user interface function for controlling the electrical device, and
   wherein the second detection mode is related to a presence detection function.

9. The sensor device according to claim 1, wherein the sensor device comprises a sensing means for measuring the orientation of the sensor device; and
   wherein the sensing means is configured to convey the orientation of the sensor device to the range sensor.

10. The sensor device according to claim 1, wherein the control signal comprises an instruction for the electrical device to adapt a lighting characteristic of a light source; and
    wherein the lighting characteristic is at least one of: an on/off sequence, an intensity, a color, a color temperature, a modulation, and a light scene.

11. The sensor device according to claim 1, wherein the controller comprises a wireless communication circuit, and
    wherein the wireless communication circuit is configured to output the control signal via at least one of: Bluetooth, ZigBee, Wi-Fi, Near Field Communication (NFC), Radio-frequency identification (RFID), Infrared Radiation (IR), Long Range (Lo-Ra), Light Fidelity (Li-Fi), Visible Light Communication (VLC), Radio-Frequency (RF), and IEEE 802.15.1.

12. The sensor device according to claim 1, wherein the object is at least one of: a person, a body part, an arm, a hand, a finger, a fingertip, a leg, a foot, a figurine, a gesture, a drone, a door, a window, a furniture, a portable device, or a portable object.

13. A control system comprising the sensor device according to claim 1 and an electrical device, wherein the sensor device is configured to control the electrical device in operation.

14. The sensor device according to claim 1, wherein the first predetermined orientation is parallel to the gravitational direction.

15. The sensor device according to claim 1, wherein the second predetermined orientation is perpendicular to the gravitational direction.

16. A method performed by a sensor device for controlling an electrical device, the sensor device having a controller and a range sensor, the method comprising:
   orienting the sensor device, by the sensor device, relative to gravity;
   obtaining an orientation of the sensor device, by the range sensor, relative to gravity;

operating the range sensor in a first detection mode for detecting a object within a first predetermined distance range from the range sensor when the orientation of the sensor device is in a first predetermined orientation;

operating the range sensor in a second detection mode for detecting the object within a second predetermined distance range from the range sensor when the orientation of the sensor device is in a second predetermined orientation, wherein the first predetermined orientation is different to the second predetermined orientation, and the first detection mode is different to the second detection mode;

outputting a control signal, by the controller, arranged for controlling the electrical device upon the range sensor detecting the object.

17. A sensor device for controlling an electrical device, the sensor device comprising:

a controller, a pivotable head, and a range sensor;

wherein the pivotable head houses the range sensor, and the pivotable head is configured to be oriented relative to a surface to which the sensor device is mounted in operation;

wherein the range sensor is configured to:

obtain an orientation of the pivotable head;

operate in a first detection mode for detecting an object within a first predetermined distance range from the range sensor when the orientation of the pivotable head is in a first predetermined orientation; and operate in a second detection mode for detecting the object within a second predetermined distance range from the range sensor when the orientation of the pivotable head is in a second predetermined orientation;

wherein the first predetermined orientation is different to the second predetermined orientation, the first detection mode is different to the second detection mode, and the controller is configured to output a control signal arranged for controlling the electrical device upon the range sensor detecting the object.

* * * * *